United States Patent [19]

Aki et al.

[11] Patent Number: 5,063,706

[45] Date of Patent: Nov. 12, 1991

[54] DEVICE FOR EXTERMINATING PESTS AND METHOD OF EXTERMINATING PEST USING THIS DEVICE

[75] Inventors: Seietsu Aki, Osaka; Takaaki Ito, Nishinomiya; Yasuo Abe, Toyonaka; Ichiro Inoue, Hino; Hiroyuki Miyachi, Tokyo, all of Japan

[73] Assignees: Sumitomo Chemical Company, Ltd., Osaka; Erika Carbon Dioxide Company, Ltd., Tokyo, both of Japan

[21] Appl. No.: 637,555

[22] Filed: Jan. 4, 1991

[30] Foreign Application Priority Data

Jan. 23, 1990 [JP] Japan ................................. 2-14315

[51] Int. Cl.$^5$ ............................................. A01M 13/00
[52] U.S. Cl. .................................... 43/125; 43/124
[58] Field of Search ........................ 43/124, 125, 900

[56] References Cited

U.S. PATENT DOCUMENTS

| | | | |
|---|---|---|---|
| 1,861,736 | 6/1932 | Bersie | 43/125 |
| 2,149,936 | 3/1939 | Collins | 43/125 |
| 2,842,892 | 7/1958 | Aldridge et al. | 43/124 |
| 3,587,978 | 7/1971 | Rollow, Jr. et al. | 239/550 |
| 3,614,841 | 10/1971 | Query | 43/124 |
| 3,676,949 | 7/1972 | Ramsey | 43/124 |
| 4,028,841 | 6/1977 | Lundwall | 43/124 |
| 4,893,434 | 1/1990 | Knipp et al. | 43/124 |
| 4,989,363 | 2/1991 | Doernemann | 43/124 |

FOREIGN PATENT DOCUMENTS

| | | |
|---|---|---|
| 52-68032 | 6/1977 | Japan . |
| 54-47880 | 4/1979 | Japan . |
| 61-13703 | 9/1981 | Japan . |
| 59-16703 | 1/1984 | Japan . |
| 60-38977 | 9/1985 | Japan . |
| 3500174 | 1/1991 | Japan . |
| 1554774 | 6/1975 | United Kingdom . |

Primary Examiner—Richard K. Seidel
Assistant Examiner—Chuck Y. Mah

[57] ABSTRACT

A device for exterminating pests having a cylinder filled with carbon dioxide in which (a) pesticide(s) is(are) dissolved, piping coupled to the cylinder, and a plurality of capillary nozzles affixed to the piping, and a method of exterminating pests employed this device. The capillary nozzles are designed such that, considering adjacent capillary nozzles, the ratio of the nozzle exit area of the capillary nozzle close to the cylinder to the nozzle exit area of the capillary nozzle remote from the cylinder is set between 1:1.3 and 1:1.8. As a result, numerous independent enclosed spaces can be sprayed with little labor and in a short time by means of a small number of devices.

6 Claims, 2 Drawing Sheets

DEVICE FOR EXTERMINATING PESTS AND METHOD OF EXTERMINATING PEST USING THIS DEVICE

BACKGROUND OF THE INVENTION

Field of the Invention

The present invention relates to a device for exterminating pests and to a method of exterminating pests employing this device. This device for exterminating pests comprises a cylinder filled with liquified carbon dioxide in which (a) pesticide(s) (an insecticide and/or a microbicide, etc.) was (were) dissolved, and connected through fixed piping to not less than two capillary nozzles.

Description of Related Art

Enclosed spaces, i.e., relatively closed spaces such as factories, offices, warehouses, restaurants, agricultural green houses, and other places possess stable environmental conditions as regard to the temperature, humidity, etc., that are favorable to the propagation of pests such as noxious insects, acarines, fungi, bacteria, etc. Hence, enclosed spaces generally need to be periodically sprayed with a chemical pesticide such as an insecticide or a microbicide, as the propagation of said pests is harmful to humans, equipment, items stored or produced, etc.

In the conventional art, the chemical agent is sprayed by atomization or fumigation of a formulation consisting of an oil formulation, emulsifiable concentrate, aerosol, fumigant or the like, by means of a device for exterminating pests through a method of exterminating pests. The particulate chemical agent is thus dispersed in the enclosed space and represses the propagation of the pests by efficiently destroying them.

However, when the conventional method of and device for exterminating pests are adopted, the atomization or fumigation has to be carried out by a worker. During the spraying operation, the worker is thus in danger of being exposed to or of inhaling the chemical agent. Moreover, when the spraying is executed through atomization or fumigation, the relatively big size of the particles composing the chemical agent may cause the spraying to be uneven. A uniform spraying of wide areas is thus difficult. As a result, the destruction of pests is performed less efficiently in relatively wide spaces.

Furthermore, when a plurality of separate enclosed spaces are to be sprayed, the spraying operation not only requires the use of a plurality of devices for exterminating pests, but is also time consuming. Also, depending on the place to be sprayed, there might be instances of contamination due to the carrier employed in the formulation, and when an oil-based aerosol formulation is adopted, the problem of the flammability of the solvent or fumigant arises.

Japanese Publication for Unexamined Patent Application No. 113703/1981 (Tokukaisho No. 56-113703) discloses an insecticide implement containing liquified carbon dioxide in which an insecticide component was dissolved.

However, the spraying of a plurality of separate enclosed spaces still requires the use of a plurality of insecticide implements, namely an insecticide implement per enclosed space, and is time consuming. In this regard, the above insecticide implement is similar to a conventional device for exterminating pests.

SUMMARY OF THE INVENTION

An object of the present invention is to provide a device for and a method of exterminating pests enabling a chemical agent to be sprayed efficiently even in relatively wide areas and without restriction with regard to the location and conditions.

Another object of the present invention is to provide a device for and a method of exterminating pests that enables a chemical agent to be sprayed in numerous independent enclosed spaces with little labor involved, in a short time and by means of a small number of devices.

In order to achieve the above objects, a device for exterminating pests in accordance with the present invention comprises a cylinder filled with liquified carbon dioxide in which a pesticide was dissolved (hereinafter referred to as carbon dioxide formulation), and piping coupled to the cylinder and provided with a plurality of capillary nozzles. The device for exterminating pests of the present invention is characterized in that the capillary nozzles are designed such that, with regard to two adjacent capillary nozzles, the ratio of the nozzle exit area of the capillary nozzle close to the cylinder, to the nozzle exit area of the remote capillary nozzle is set between 1:1.3 and 1:1.8.

A method of exterminating pests in accordance with the present invention consists in spraying a pesticide by means of the above device for exterminating pests, and permits removal of pests and/or to prevent plant diseases.

With the above arrangement, a plurality of capillary nozzles are affixed to the piping coupled to the cylinder. The nozzle exit area of each capillary nozzle is designed such that, considering adjacent capillary nozzles, the ratio of the nozzle exit area of the capillary nozzle that is close to the cylinder, to the nozzle exit area of the remote capillary nozzle is set between 1:1.3 and 1:1.8. This arrangement enables the chemical agent, i.e., the pesticide, to be sprayed in a substantially equal amount from each capillary nozzle. As a result, when for instance each capillary nozzle is installed in a different enclosed space, the chemical agent may be sprayed in a substantially equal amount in each enclosed space. Hence, a single device for exterminating pests may be adopted for a plurality of enclosed spaces, whereby the chemical agent may be sprayed with little labor, in a short time and by means of a small number of devices for exterminating pests, even when the chemical agent has to be sprayed in numerous independent enclosed spaces.

Furthermore, when the device for and the method of exterminating pests of the present invention are adopted, the chemical agent is sprayed together with non-toxic and non-combustible carbon dioxide. There are thus no restrictions as to the location or conditions of the spraying. In addition, advantage is taken of the rapid expansion of liquified carbon dioxide during gasification for spraying the chemical agent. The chemical agent may be thus reduced to minute particles and sprayed efficiently even in relatively wide spaces.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic block diagram illustrating a device for exterminating pests installed in a plurality of agricultural green houses.

FIG. 2 is a schematic block diagram illustrating the device for exterminating pests installed in a plurality of separated rooms accommodated in a building.

DETAILED DESCRIPTION OF PREFERRED EMBODIMENTS

An embodiment of the present invention will be described hereinbelow with reference to FIG. 1 and FIG. 2.

Figure 1:
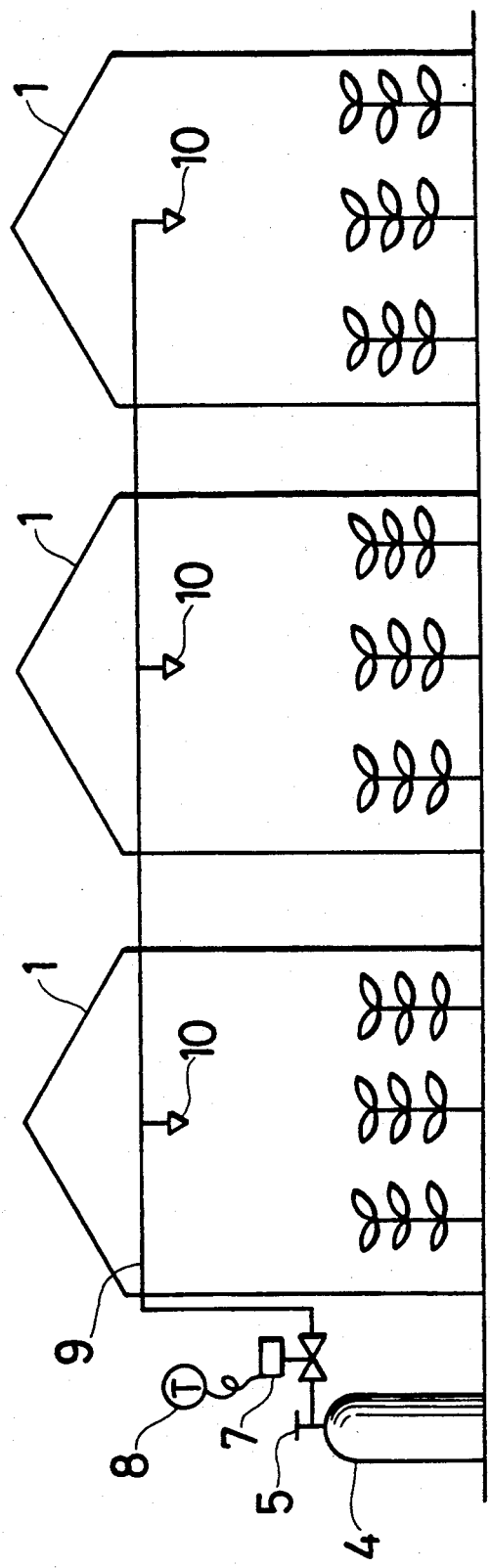
FIG. 1 and FIG. 2 illustrate an embodiment of the present invention.
Figure 2:
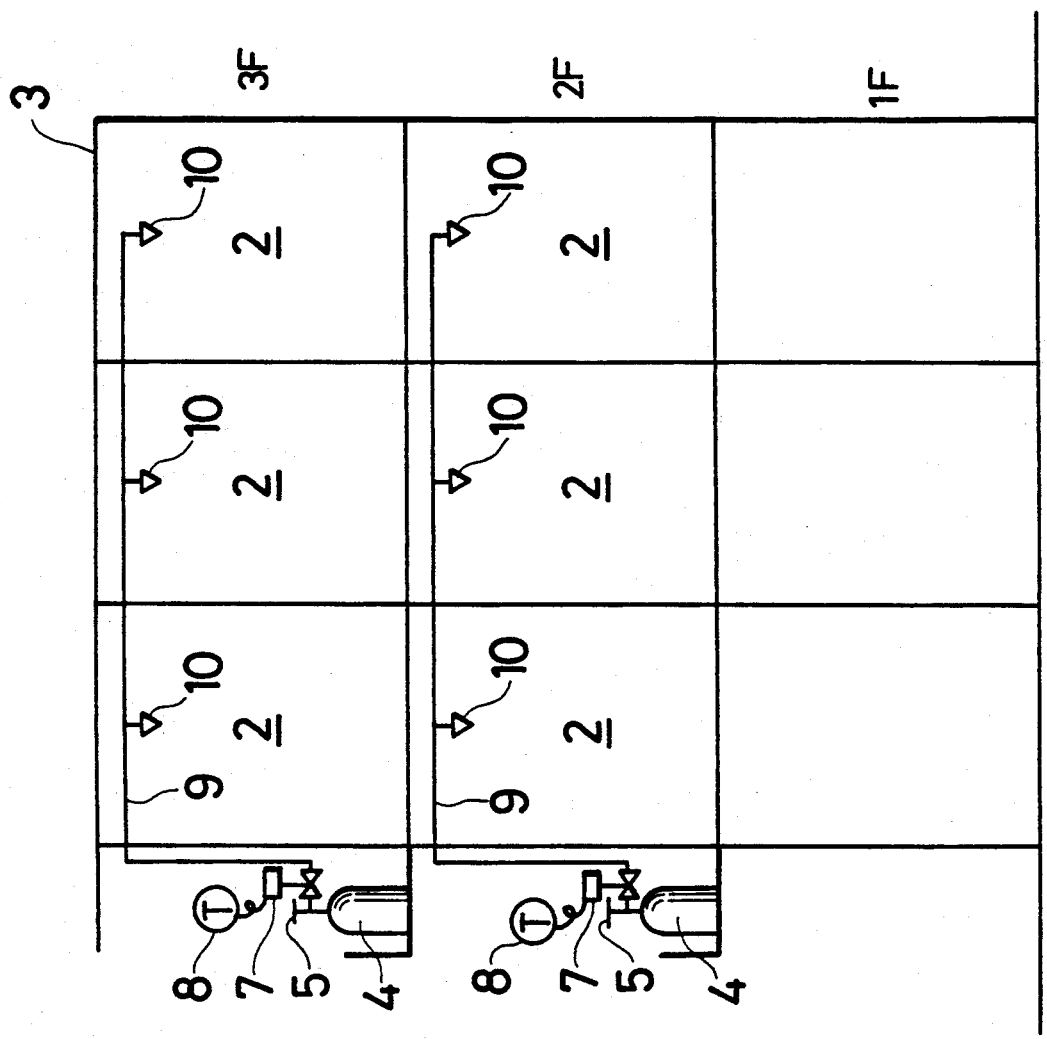

The device for exterminating pests of the present embodiment is installed in a plurality of enclosed spaces, i.e., agricultural green houses 1 shown in FIG. 1, or a plurality of separated enclosed spaces, i.e., rooms 2 accommodated in a building 3 shown in FIG. 2, and implemented by means of a method for exterminating pests of the present embodiment. The above device for and method of exterminating pests may also be adapted to factories, offices, warehouses, museums, restaurants, cattle sheds, green houses for horticulture, etc. as long as these places are relatively closed spaces.

The device for exterminating pests comprises a cylinder 4 having a pressure resistance of 250 kg/cm$^2$ and filled with liquified carbon dioxide. In the liquified carbon dioxide is dissolved a chemical agent composed of a single pesticide such as an insecticide, an acaricide, a microbicide (fungicide, bactericide, etc.) etc., or a chemical agent composed of a mixture of pesticides. The amount of chemical agent contained in the liquified carbon dioxide is 0.01 to 5% by weight.

The cylinder 4 is disposed outdoors and a cylinder valve 5 is mounted upon the upper end thereof. The cylinder valve 5 is coupled to a solenoid valve 7 for liquified carbon dioxide, e.g. a two way solenoid valve (BULLETIN 8264, manufactured by Automatic Switch Co.). A timer 8 that is capable of executing an ON-OFF control based on a predetermined unit time, is coupled to the solenoid valve 7. Such an arrangement enables the chemical agent, i.e. the pesticide such as insecticide, acaricide, microbicide (fungicide, bactericide, etc.) or the like, or mixtures thereof, to be sprayed inside the agricultural green houses 1 at fixed hours without the need for a worker.

A pressure gauge (manufactured by Nagano Instruments Co.), not shown, is fitted between the solenoid valve 7 and the cylinder valve 5. Provision is made such that the pressure of a carbon dioxide formulation present inside the cylinder 4 and a piping 9 is detected by the above pressure gauge. The piping 9 is made of, for example, stainless steel, copper, pressure resistant resin, or other material, and is designed such as to have a bore of 2.0 to 4.0 mm and a total length comprises within 100 m.

As illustrated in FIG. 1, the piping 9 is mounted vertically along a lateral wall of the agricultural green house 1 close to the cylinder 4, and then horizontally traverses all the agricultural green houses 1 in the upper section thereof. Capillary nozzles 10 are fixed to the piping 9 traversing the agricultural green houses 1 to spray the carbon dioxide formulation inside each of the agricultural green houses 1. The capillary nozzles 10 are designed to have a bore of 0.3 to 2.0 mm and the ratio of the bores of adjacent nozzles 10 is set such that, when the nozzle exit area of the nozzle 10 close to the cylinder 4 is 1.0, the nozzle exit area of the nozzle 10 far from the cylinder 4 is between 1.3 and 1.8.

Here, provision has to be made such that the sum of the nozzle exit areas of the capillary nozzles 10 does not exceed the cross-sectional area of the piping 9. Also, a maximum of ten capillary nozzles 10 can be fixed to a single piping 9 and the distance between two capillary nozzles 10 should preferably be comprised within 5 to 20 m.

The insecticide sprayed from the capillary nozzles 10 may be: pyrethroid insecticides such as α-cyano-3-phenoxybenzyl 3-(2,2-dichlorovinyl)-2, 2-dimethylcyclopropanecarboxylate; α-cyano-3-phenoxybenzyl chrysanthemate; α-cyano-3-phenoxybenzyl 3-(2,2-dibromovinyl)-2,2-dimethylcyclopropanecarboxylate; α-cyano-(4-fluoro-3-phenoxy)benzyl 3-(2,2-dichlorovinyl)-2,2-dimethylcyclopropanecarboxylate; 2-(4-ethoxyphenyl)-2-methylpropyl 3-phenoxybenzyl ether; α-cyano-3-phenoxybenzyl 2-(4-chlorophenyl)-3-methylbutyrate; α-cyano-3-phenoxybenzyl 2-[2-chloro-4-(trifluoromethyl)anilino]-3-methylbutanoate; 3-phenoxybenzyl chrysanthemate; α-cyano-3-phenoxybenzyl 2,2,3,3-tetramethylcyclopropanecarboxylate; α-cyano-3-phenoxybenzyl 3-(2-chloro-3,3,3-trifluoro-1-propenyl)-2,2-dimethylcyclopropanecarboxylate; α-cyano-3-phenoxybenzyl 2-(4-difluoromethoxyphenyl)-3-methylbutyrate; 5-benzyl-3-furylmethyl chrysanthemate; 3-allyl-2-methyl-4-oxocyclopent-2-enyl chrysanthemate; 2-methyl-4-oxo-3-(2-propynyl)cyclopent-2-enyl chrysanthemate; 1-ethynyl-2-methyl-2-pentenyl chrysanthemate; 3,4,5,6-tetrahydrophthalimidomethyl chrysanthemate; organophosphorus insecticides such as 0,0-diethyl 0-(2-isopropyl-4-methyl-6-pyrimidinyl) phosphorothioate; 0,0-dimethyl 0-(3-methyl-4-nitrophenyl)phosphorothioate; 0-(4-bromo-2,5-dichlorophenyl)-0,0-dimethylphosphorothioate; 2,2-dichlorovinyl dimethyl phosphate; etc.

The above insecticides enable removal of hygienic pests such as *Periplaneta fluginosa, Blattella germanica, Musca domestica, Boettcherisca peregrina, Culex pipiens pallens, Culex tritaeniorhyncus, Ctenocephalides canis, Ctenocephalides felis, Ornithonyssus bacoti, Tyrophagus dimidiatus, Pediculus humanus corporis, Pediculus humanus, Cimex lectularius*, etc. The above insecticide also permits to destroy nuisance pests such as *Chiracanthium japonicum, Scolopendra subspimpes mutilans*, Scolioidea, *Verpa simillima xanthoptera, Formica japonica, Oxidus gracilis, Thereuronema hilgendorfi, Chironomus yoshimatsui, Diestrammena apicalis, Armadilidium vulgare* and the like, and fabric pests such as *Tinea pellionella, Tineola bisselliella, Attagenus unicolor, Anthrenus verbasci*, etc.

Vegetable pests can also be exterminated, such as *Pieris rapae crucivora, Plutella xylostella, Hellulla undalis, Phyllotreta striolata, Phaedon brassicae, Brevicoryne brassicae, Lipaphis erysimi, Spodoptera litura, Agrotis segetum, Listroderes costirostris, Myzus persicae, Trialeurodes vaporariorum, Epilachna vigintioctomaculata, Delia antiqua, Thrips tabaci, Dacus depressus*, etc. The above insecticide also enables to get rid of orchard pests such as *Grapholita molesta, Carposina niponensis, Synanthedon hector, Unaspis yanonensis, Ceroplastes rubens, Dacus dorsalis*, etc. Pests found in soybeans and beans as well as pests found in rice, wheat and other cereals, can also be destroyed. Here, the pests found in soybeans and beans include *Leguminivora glycinivorella, Etiella zinckenella, Anomala rufocuprea*, etc., and the pests found in rice, wheat and other grains include *Chilo suppressalis, Nilaparvata lugens, Bothrogonia japonica, Parnara guttata, Echinocnemus squameus, Nephrotoma virgata, Sitodiplosis mosellana, Onychiurus pseudarmatus yagii, Melanotus fortnumi*, etc.

Stored grain pests include *Tribolium castaneum, Tribolium confusum, Tenebrio obscurus, Alphitobius diaperinus, Sitophilus zeamais, Sitophilus oryzae, Dermestes maculatus, Dermestes ater, Stegobium paniceum, Lasioderma serriocorne, Ptinus japonicus, Gibbium aequinoctiale, Callosobruchus maculatus, Callosobruchus chinensis, Acanthoscelides obtectus, Bruchus pisorum, Bruchus*

*rufimanus, Plodia interpunctella, Anagasta kueh, Sitotroga cerealella, Liposcelis bostrychophilus*, etc.

Agricultural and horticultural microbicides (fungicides and/or bactericides, etc.) include: aluminum tris(-0-ethylphosphonate); 1-(4-chlorophenoxy)-3,3-dimethyl-1-(1H-1,2,4-triazol-1-yl)-2-butanone; methyl 1-(butylcarbamoyl)-2-benzimidazolcarbamate; cis-N-[(trichloromethyl)thio]-4-cyclohexene-1,2-dicarboximide; tetrachloroisophthalonitrile; 1,1-dichloro-N-[(dimethylamino)sulfonyl]-1-fluoro-N-phenylmethane; manganese ethylenebis (dithiocarbamate); 3'-isopropoxy-2-methylbenzanilide; 2-methoxy-N-(2-oxo-1,3-oxazolidine-3-yl)aceto-2',6'-xylidide; 1-5'-N-(5''-0-carbamoyl-2''-amino-2''-deoxy-L-xylonyl)-5'-amino-5'-deoxy-$\beta$-D-allofuranosyl-uronic acid)-5-hydroxymethyl uracil; N-(3,5-dichlorophenyl)-1,2-dimethylcyclopropane-1,2-dicarboximide; zinc ethylenebis(dithiocarbamate); sulfur, etc.

The above microbicides are effective for diseases such as downy mildew, gray mold, sclerotinia rot, gummy stem blight, anthracnose, powdery mildew, late blight, leaf mold, damping-off, scab, bacterial spot, phoma root rot, rust, fruit spot, etc.

Contaminating microorganism such as Aspergillus (e.g., *A. niger, A. terreus*), Eurotium (e.g., *E. tonophilum*), Penicillium (e.g., *P. citrinum, P. funiculosum*), Rhizopus (e.g., *R. oryzae*), Cladosporium (e.g., *C. cladosporioides*), Aureobasidium (e.g., *A. pullulans*), Gliocladium (e.g., *G. virens*), Chaetomium (e.g., *C. globsum*), Gibberella (e.g., *G. fujikuroi*), Myrothecium (e.g., *M. verrucaria*), Alternaria (e.g., *A. kikuchiana*), Staphylococcus (e.g., *S. aureus*), Bacillus (e.g., *B. subtilitis*), Escherichia (e.g., *E. coli*), Pseudomonas (e.g., *P. aeruginosa*), etc., can be removed through the use of an industrial microbicide.

Usable industrial microbicides include 5-chloro-2-methyl-4-isothiazoline-3-one; 2-n-octyl-4-isothiazoline-3-one; 10,10'-oxybisphenoxarsine; 2-(4'-thiazolyl)benzimidazole; p-chlorophenyl-3-iodo-2-propynyl formal; 3-iodo-2-propynyl butyl carbamate; N-(fluorodichloromethylthio)phthalimide; N,N-dimethyl-N'-(dichlorofluoromethylthio)-N'-phenylsulfamide; p-chloro-m-xylenol; sodium hypochlorite; thymol; benzethonium chloride; 3,5-dimethyl-4-chlorophenol; etc.

When the chemical agent used in the present invention has stereoisomers, the pestically active isomer and mixtures thereof are included in the chemical agent(s) in the present invention.

When the device for exterminating pests of the present invention is employed for atomizing the carbon dioxide formulation, the amount of carbon dioxide formulation to be atomized depends on the location, area, type of chemical agent, type of insects, microorganisms, etc. to be exterminated, etc., but should preferably be as follows. Supposing that a 10 liter cylinder is used and that a carbon dioxide formulation containing 0.3% of 3-phenoxybenzyl (1R)-cis,trans-chrysanthemate (namely, d-phenothrin), has to be sprayed in three rooms of 25 $m^3$ each, the carbon dioxide formulation should normally be atomized once a day in an amount of 20 to 100 g to exterminate flies and mosquitoes. When cockroaches have to be destroyed, the carbon dioxide formulation should normally be atomized once a week or once every other week in an amount of 100 to 500 g.

With the above conditions, the present invention will be discussed in more detail hereinbelow.

EXAMPLE 1

21 g of chemical agent, i.e., d-cyphenothrin (namely, (RS)-α-cyano-3-phenoxybenzyl (1R)-cis,trans-chrysanthemate), were placed in a cylinder, namely a gas bomb having a capacity of 10 liters, and the cylinder was filled with 7 kg of liquified carbon dioxide. A piping made of copper and having a bore of 2 mm and a total length of 30 m, was then affixed through of a valve to the inlet of the cylinder. Three capillary nozzles having a bore diameter respectively 0.3, 0.4 and 0.5 mm in order of proximity to the cylinder, were affixed to the piping at intervals of 10 m. Then, the cylinder valve was opened and the carbon dioxide formulation was discharged through each of the capillary nozzles for three minutes. The amount of chemical agent discharged was measured through the following method.

Namely, the chemical agent that was discharged through each capillary nozzle together with the carbon dioxide, was directed into a 3 liter Erlenmeyer flask containing 1 liter of acetone, recovered in the acetone, analyzed and quantified through gas chromatography. Here, the measurement was conducted in the following conditions.

| | |
|---|---|
| Detector | FID |
| Column | 3% silicon OV-101 [Uniport HP (100-120 mesh)] 1 m × 3 mmφ |
| Temperature | column 220° C. inlet 260° C. |
| Carrier gas | $N_2$ 50 ml/min. |

The results of the above measurement are indicated in Table 1. Table 1 also shows the relative amount discharged from each capillary nozzle, when the average value of the amount discharged by the capillary nozzles is used as reference "1".

TABLE 1

| | | | |
|---|---|---|---|
| piping bore (mm) | | 2 | |
| nozzle exit bore (mm) | 0.3 | 0.4 | 0.5 |
| nozzle exit area ratio | 1 | 1.8 | 1.6 |
| of adjacent nozzles | | 1 | |
| discharge time (min.) | | 3 | |
| agent discharge amount (g) | 1.508 | 1.928 | 2.037 |
| average | | 1.824 | |
| relative discharge amount | 0.83 | 1.06 | 1.12 |
| when the average is 1 | | | |
| average | | 1 | |

EXAMPLE 2

Like in example 1, piping made of copper and having a bore of 2 mm and a total length of 30 m, was affixed through a valve to a cylinder filled with a liquified carbon dioxide formulation. Three capillary nozzles of respectively 0.4, 0.5 and 0.6 mm in order of proximity to the cylinder, were mounted on the piping at intervals of 10 m. Then, the cylinder valve was opened and the carbon dioxide formulation was discharged through each of the capillary nozzles for two minutes. The chemical agent was quantified through the same measuring method and in the same conditions as in example 1. The results of the measurement are shown in Table 2.

TABLE 2

| | | | |
|---|---|---|---|
| piping bore (mm) | | 2 | |
| nozzle exit bore (mm) | 0.4 | 0.5 | 0.6 |

TABLE 2-continued

| | | | |
|---|---|---|---|
| nozzle exit area ratio of adjacent nozzles | 1 | 1.6 1 | 1.4 |
| discharge time (min.) | | 2 | |
| agent discharge amount (g) average | 2.042 | 1.540 1.992 | 2.394 |
| relative discharge amount when the average is 1 average | 1.03 | 0.77 1 | 1.20 |

EXAMPLE 3

Like in example 1, piping made of copper and having a bore of 2 mm and a total length of 30 m, was affixed through a valve to a cylinder filled with a liquified carbon dioxide formulation. Three capillary nozzles of respectively 0.5, 0.6 and 0.7 mm in order of proximity to the cylinder, were mounted on the piping at intervals of 10 m. Then, the cylinder valve was opened and the carbon dioxide formulation was discharged through each of the capillary nozzles for three minutes. The chemical agent was quantified through the same measuring method and in the same conditions as in example 1. The results of the measurement are shown in Table 3.

TABLE 3

| | | | |
|---|---|---|---|
| piping bore (mm) | | 2 | |
| nozzle exit bore (mm) | 0.5 | 0.6 | 0.7 |
| nozzle exit area ratio of adjacent nozzles | 1 | 1.4 1 | 1.4 |
| discharge time (min.) | | 3 | |
| agent discharge amount (g) average | 2.058 | 2.139 2.346 | 2.841 |
| relative discharge amount when the average is 1 average | 0.88 | 0.91 1 | 1.21 |

EXAMPLE 4

Like in example 1, piping made of copper and having a bore of 2 mm and a total length of 30 m, was affixed through a valve to a cylinder filled with a liquefied carbon dioxide formulation. Three capillary nozzles of respectively 0.6, 0.7 and 0.8 mm in order of proximity to the cylinder, were mounted on the piping at intervals of 10 m. Then, the cylinder valve was opened and the carbon dioxide formulation was discharged through each of the capillary nozzles for two minutes. The chemical agent was quantified through the same measuring method and in the same conditions as in example 1. The results of the measurement are shown in Table 4.

TABLE 4

| | | | |
|---|---|---|---|
| piping bore (mm) | | 2 | |
| nozzle exit bore (mm) | 0.6 | 0.7 | 0.8 |
| nozzle exit area ratio of adjacent nozzles | 1 | 1.4 1 | 1.3 |
| discharge time (min.) | | 2 | |
| agent discharge amount (g) average | 2.419 | 1.601 2.244 | 2.712 |
| relative discharge amount when the average is 1 average | 1.08 | 0.71 1 | 1.21 |

EXAMPLE 5

Like in example 1, piping made of copper and having a bore of 4 mm and a total length of 30 m, was affixed through a valve to a cylinder filled with a liquified carbon dioxide formulation. Three capillary nozzles of respectively 0.3, 0.4 and 0.5 mm in order of proximity to the cylinder, were mounted on the piping at intervals of 10 m. Then, the cylinder valve was opened and the carbon dioxide formulation was discharged through each of the capillary nozzles for two minutes. The chemical agent was quantified through the same measuring method and in the same conditions as in example 1. The results of the measurement are shown in Table 5.

TABLE 5

| | | | |
|---|---|---|---|
| piping bore (mm) | | 4 | |
| nozzle exit bore (mm) | 0.3 | 0.4 | 0.5 |
| nozzle exit area ratio of adjacent nozzles | 1 | 1.7 1 | 1.6 |
| discharge time (min.) | | 2 | |
| agent discharge amount (g) average | 1.558 | 2.124 2.055 | 2.482 |
| relative discharge amount when the average is 1 average | 0.76 | 1.03 1 | 1.21 |

EXAMPLE 6

Like in example 1, piping made of copper and having a bore of 4 mm and a total length of 30 m, was affixed through a valve to a cylinder filled with a liquified carbon dioxide formulation. Three capillary nozzles of respectively 0.4, 0.5 and 0.6 mm in order of proximity to the cylinder, were mounted on the piping at intervals of 10 m. Then, the cylinder valve was opened and the carbon dioxide formulation was discharged through each of the capillary nozzles for two minutes. The chemical agent was quantified through the same measuring method and in the same conditions as in example 1. The results of the measurement are shown in Table 6.

TABLE 6

| | | | |
|---|---|---|---|
| piping bore (mm) | | 4 | |
| nozzle exit bore (mm) | 0.4 | 0.5 | 0.6 |
| nozzle exit area ratio of adjacent nozzles | 1 | 1.6 1 | 1.4 |
| discharge time (min.) | | 2 | |
| agent discharge amount (g) average | 2.381 | 2.057 2.544 | 3.195 |
| relative discharge amount when the average is 1 average | 0.94 | 0.81 1 | 1.26 |

COMPARATIVE EXAMPLE 1

Like in example 1, piping made of copper and having a bore of 2 mm and a total length of 30 m, was affixed through a valve to a cylinder filled with a liquified carbon dioxide formulation. Three capillary nozzles of 0.3 mm each were mounted on the piping at intervals of 10 m. Then, the cylinder valve was opened and the carbon dioxide formulation was discharged through each of the capillary nozzles for five minutes. The chemical agent was quantified through the same measuring method and in the same conditions as in example 1. The results of the measurement are shown in Table 7.

TABLE 7

| | | | |
|---|---|---|---|
| piping bore (mm) | | 2 | |
| nozzle exit bore (mm) | 0.3 | 0.3 | 0.3 |
| nozzle exit area ratio of adjacent nozzles | 1 | 1 1 | 1 |
| discharge time (min.) | | 5 | |
| agent discharge amount (g) average | 3.037 | 2.801 2.451 | 1.515 |

TABLE 7-continued

| | | | |
|---|---|---|---|
| relative discharge amount when the average is 1 | 1.24 | 1.14 | 0.62 |
| average | | 1 | |

COMPARATIVE EXAMPLE 2

Like in example 1, piping made of copper and having a bore of 2 mm and a total length of 30 m, was affixed through a valve to a cylinder filled with a liquified carbon dioxide formulation. Three capillary nozzles of respectively 0.3, 0.5 and 0.7 mm in order of proximity to the cylinder, were mounted on the piping at intervals of 10 m. Then, the cylinder valve was opened and the carbon dioxide was discharged through each of the capillary nozzles for three minutes. The chemical agent was quantified through the same measuring method and in the same conditions as in example 1. The results of the measurement are shown in Table 8.

TABLE 8

| | | | |
|---|---|---|---|
| piping bore (mm) | | 2 | |
| nozzle exit bore (mm) | 0.3 | 0.5 | 0.7 |
| nozzle exit area ratio of adjacent nozzles | 1 | 2.8 | 1.9 |
| | | 1 | |
| discharge time (min.) | | 3 | |
| agent discharge amount (g) | 1.586 | 2.017 | 3.205 |
| average | | 2.269 | |
| relative discharge amount when the average is 1 | 0.70 | 0.89 | 1.41 |
| average | | 1 | |

The following conclusions can be drawn from the measurements executed in examples 1 to 6 and comparative examples 1 and 2.

Namely, when the capillary nozzles affixed to the piping have equal exit bores, as is the case in comparative example 1, the closer to the cylinder, the greater the amount of discharged chemical agent is. Compared to the average relative chemical agent discharge amount, the relative chemical agent discharge amount of the most remote capillary nozzle shows a decrease of more than 30% and is equal to 0.62. This clearly shows that a uniform atomization is infeasible when the capillary nozzles have equal exit bores.

Furthermore, when the ratio of the nozzle exit area of the capillary nozzles exceeds 1.8 times, as is the case in comparative example 2, the relative amount of chemical agent discharged by the capillary nozzle having an exit bore of 0.7 mm is equal to 1.41. This shows that, like in comparative example 1, a uniform atomization is infeasible.

On the other hand, when, as in examples 1 through 6, the nozzle exit area ratio of two adjacent capillary nozzles is set such that, suppose the nozzle exit area of the capillary nozzle close to the cylinder is 1, the nozzle exit area of the remote capillary nozzle is 1.3 to 1.8, the relative amount of chemical agent discharged is equal to: 0.83 to 1.12 in example 1; 0.77 to 1.20 in example 2; 0.88 to 1.21 in example 3; 0.71 to 1.21 in example 4; 0.76 to 1.21 in example 5; and 0.81 to 1.26 in example 6. These results clearly show that the chemical agent was discharged and atomized from all the capillary nozzles in a substantially equal amount.

Accordingly, a plurality of capillary nozzles are affixed to the piping connected to the cylinder, and the chemical agent is discharged in a substantially equal amount from each capillary nozzle. As a result, when as illustrated in FIG. 1 and FIG. 2, a capillary nozzle 10 is installed in each agricultural green house 10 or each room 2, numerous independent enclosed spaces can be sprayed within a short time by means of a small number of devices for exterminating pests. In addition, the spraying operation may be executed by a small number of workers.

Moreover, when the device for and method of exterminating pests of the present invention are adopted, the chemical agent may be sprayed together with non-toxic and non-combustible carbon dioxide. There are thus no restrictions as to the location and the conditions of the spraying. In addition, advantage is taken of the rapid expansion of liquified carbon dioxide during gasification for spraying the chemical agent. The chemical agent may be thus reduced to minute particles and sprayed efficiently even in relatively wide spaces.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A device for exterminating pests comprising:
    a cylinder filled with liquified carbon dioxide in which at least one pesticide is dissolved;
    piping coupled to said cylinder; and
    a plurality of capillary nozzles affixed to said piping, said capillary nozzles being designed such that, with regard to adjacent capillary nozzles, the ratio of a nozzle exit area of a capillary nozzle close to said cylinder, to a nozzle exit area of a capillary nozzle remote from said cylinder, is set between 1:1.3 and 1:1.8.

2. A device for exterminating pests as defined in claim 1, wherein the bore of said piping is set between 2.0 and 4.0 mm, and the bore of each of said capillary nozzles is set between 0.3 and 2.0 mm.

3. A device for exterminating pests as defined in claim 1, further comprising:
    a solenoid valve mounted between and coupled to said cylinder and said piping; and
    a timer coupled to said solenoid valve and capable of executing an ON-OFF control based on a predetermined unit time.

4. A device for exterminating pests as defined in claim 1, wherein said at least one pesticide is contained in an amount of 0.01 to 5% by weight in said liquified carbon dioxide.

5. A device for exterminating pests as defined in claim 1, wherein said capillary nozzles are 2 to 10 capillary nozzles installed at every 5 to 20 m intervals.

6. A device for exterminating pests as defined in claim 1, wherein the sum of the nozzle exit areas of said capillary nozzles is set smaller than the cross-sectional area of said piping.

* * * * *

UNITED STATES PATENT AND TRADEMARK OFFICE
CERTIFICATE OF CORRECTION

PATENT NO. : 5,063,706
DATED : November 12, 1991
INVENTOR(S) : Aki, et. al.

It is certified that error appears in the above-indentified patent and that said Letters Patent is hereby corrected as shown below:

On the Title page, item [54], line 1 and in col. 1, lines 2 and 3, change "DEVICE FOR EXTERMINATING PESTS AND METHOD OF EXTERMINATING PEST USING THIS DEVICE" to --DEVICE FOR EXTERMINATING PESTS AND METHOD OF EXTERMINATING PESTS USING THIS DEVICE--

Signed and Sealed this

Sixth Day of July, 1993

Attest:

MICHAEL K. KIRK

*Attesting Officer*   *Acting Commissioner of Patents and Trademarks*

UNITED STATES PATENT AND TRADEMARK OFFICE
CERTIFICATE OF CORRECTION

PATENT NO. : 5,063,706
DATED : Nov. 12, 1991
INVENTOR(S) : Aki et al.

It is certified that error appears in the above-identified patent and that said Letters Patent is hereby corrected as shown below:

On the title page, Item "[73] Assignees:" change "Erika Carbon Dioxide Company, Ltd." to --Ekika Carbon Dioxide Company, Limited--.

Signed and Sealed this

Fourteenth Day of June, 1994

*Attest:*

BRUCE LEHMAN

*Attesting Officer*   *Commissioner of Patents and Trademarks*